(No Model.) 2 Sheets—Sheet 1.
M. SULLIVAN & H. CHRISTOFFORSON.
Thrashing Machine.
No. 232,087. Patented Sept. 7, 1880.
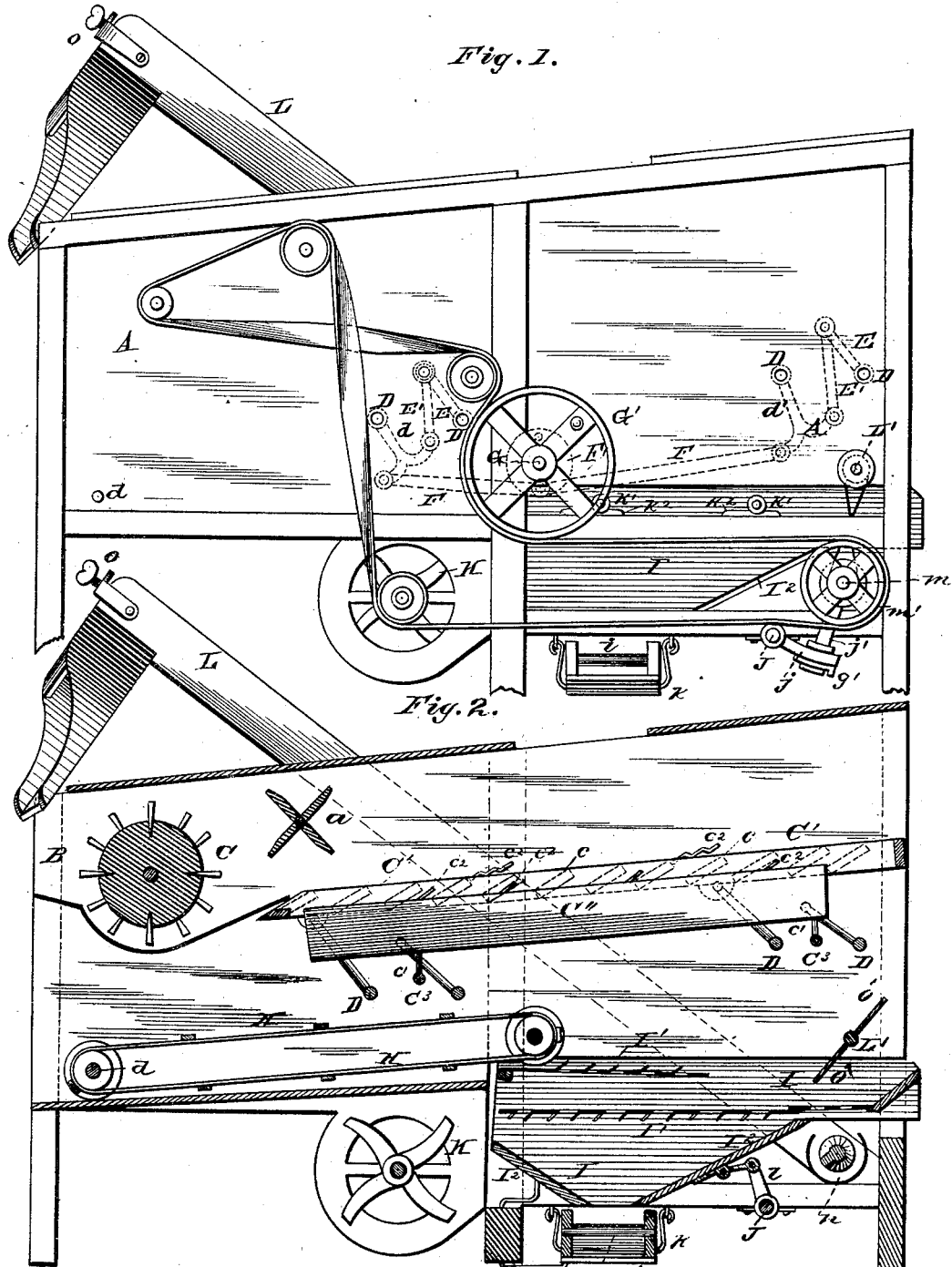

(No Model.) 2 Sheets—Sheet 2.
M. SULLIVAN & H. CHRISTOFFORSON.
Thrashing Machine.
No. 232,087. Patented Sept. 7, 1880.
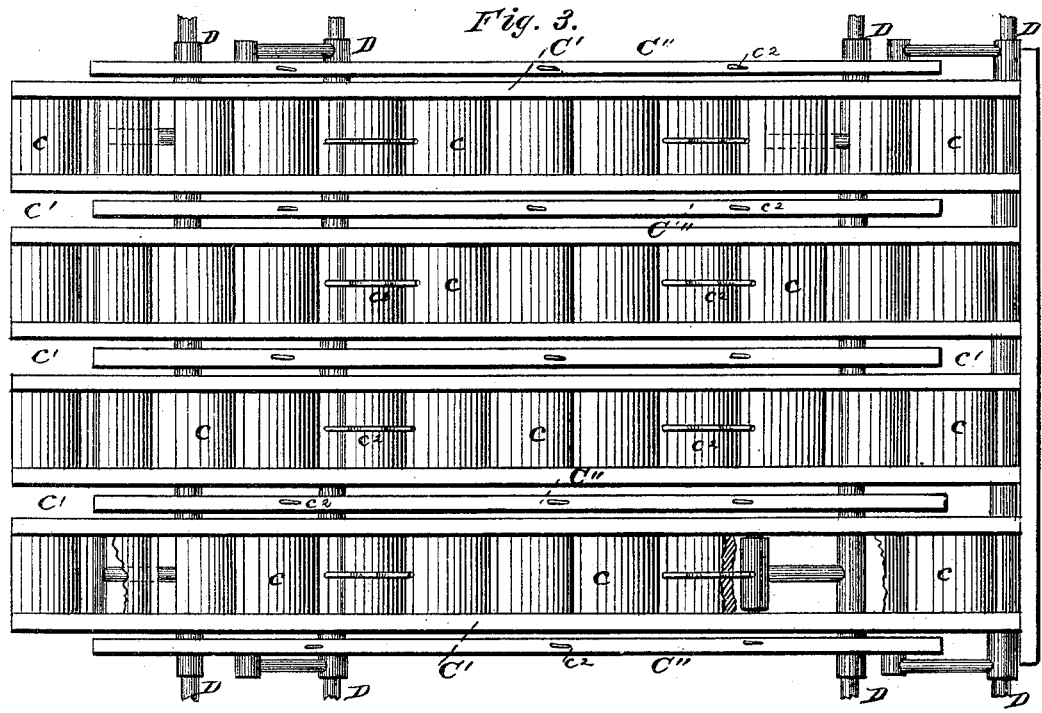
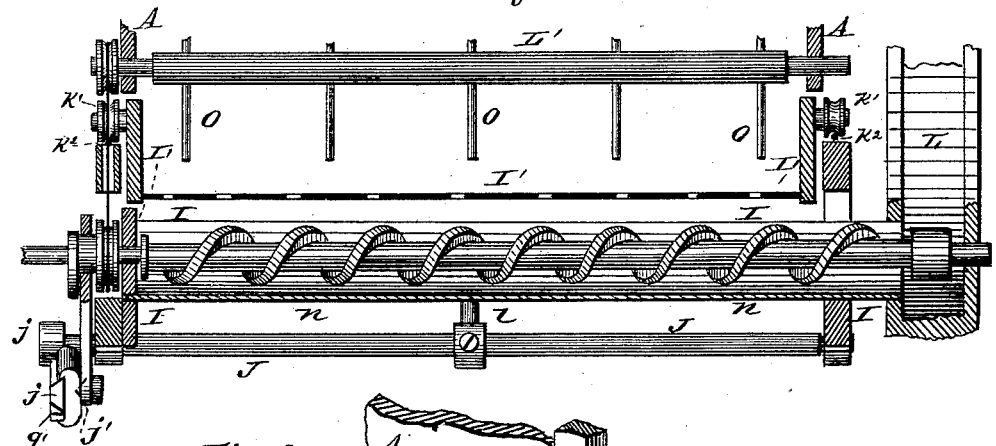
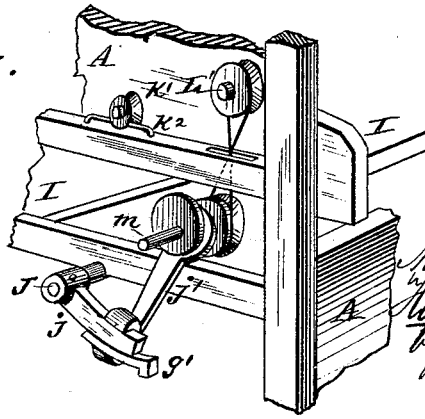
Witnesses:
Fred G. Dieterich
P. C. Dieterich
Inventors:
Michael Sullivan
Hans Christofforson
by Louis Bagger & Co.
Attorneys

UNITED STATES PATENT OFFICE.

MICHAEL SULLIVAN AND HANS CHRISTOFFORSON, OF WEST DEPERE, ASSIGNORS OF ONE-THIRD OF THEIR RIGHT TO KELLY & HUGHES, OF HUDSON, WISCONSIN.

THRASHING-MACHINE.

SPECIFICATION forming part of Letters Patent No. 232,087, dated September 7, 1880.

Application filed May 3, 1880. (No model.)

*To all whom it may concern:*

Be it known that we, MICHAEL SULLIVAN and HANS CHRISTOFFORSON, of West Depere, in the county of Brown and State of Wisconsin, have invented certain new and useful Improvements in Thrashing-Machines; and we do hereby declare that the following is a full, clear, and exact description thereof, which will enable others skilled in the art to which it appertains to make and use the same, reference being had to the accompanying drawings, which form a part of this specification, and in which—

Figure 1 is a side view of our improved thrashing-machine. Fig. 2 is a longitudinal section of the same. Fig. 3 is a detail view, showing the interoperating straw and grain separators and straw-carrier. Fig. 4 is a cross-section taken to one side of and showing more fully the shoe-motion-regulating device; and Fig. 5 is a detail view of said device.

This invention contemplates improvements in thrashing-machines to effect the ready and thorough separation of the grain from the straw, with the expediting of the passing of the grain to the shoe and the carrying off of the straw, and to regulate the amount of vibration or agitation to be imparted to the shoe; and to these ends it consists of certain mechanism, substantially as hereinafter more fully set forth, and particularly pointed out in the claim.

In the accompanying drawings, A marks the casing or housing containing the several operative parts. B is the feed-hopper, within which is hung the thrashing-cylinder C; and $a$ is the beater, with the blades, to aid in beating out the grain as the straw passes under it to the interoperating rack-frame and toothed bars. C' is the rack-frame, composed of a series of longitudinally-arranged rows of short inclined boards or steps, $c\ c$, with intermediate spaces between for the grain to fall on the shoe and carrier below. Between these rows of steps or boards $c$ are longitudinal spaces $c'$, to permit of the vertical vibration therein of edgewise-disposed bars or boards C'', both which frame and bars or boards are connected by crank-arms $d\ d'$ to transverse horizontally-vibrating shafts D, with one of their ends connected to cranks E E, acting in opposite directions, and which are connected together by links E', while one of them at each end is connected to a pitman, F, eccentrically attached to a disk or eccentric, F', on the driving-wheel shaft G with the driving-wheel G'. The bars or boards C'' are connected at their ends by pins or rods $c'$ to cross rods or bars $C^3$, while said boards themselves are provided upon their upper surface with inclined pins $c^2$, as is also the frame C', to aid their action. The frame C' and boards C'' derive from the cranks and their shafts and the pitman and eccentric an alternate rising and falling motion in an inclined plane; or, in other words, they have an alternate joint vertical and rearward vibratory motion, to subject the straw, with the adhering grain, while feeding it to the rear end of the thrasher, to a thorough shaking and separating action, to permit, or rather cause, the falling of the grain as thoroughly as possible through them upon the apron or carrier and the shoe, with the passing of the straw out of the machine.

H is an apron or carrier-belt frame encompassing and driven by the driving-wheel shaft and a second shaft, $d$, at the forward end of the straw-carrier, and catches any falling grain from the hopper out to and under the frame C' and boards C'', and conducts and deposits it upon the shoe.

I is the shoe, with a number of screens or riddles, I', as usual, and having a double-inclined bottom, $I^2$, with a wire-covered discharge-opening, $i$, under which is hung a double-inclined trough, $k$, discharging at its center. The shoe I is suspended by friction-pulleys $k'$, traveling upon ways $k^2$ upon side bars of the housing A, while to its under side is hinged or pivoted the crank-arm $l$ of a shaft, J, hung in bearings secured to the under-side edges of the housing, re-enforced, if needed, by strips or bars. This shaft is connected by a curved or segmental arm, $j$, on one end thereof, to an arm, $j'$, eccentrically connected to the shaft $m$, carrying a driving-belt pulley, $m'$.

The arm $j'$ is provided with a socket, into which the curved arm $j$ fits, and which permits, by loosening of the wedge or key $g'$, the lengthening or shortening of the vibration of the shoe.

K is the fan for driving out the dust, and is hung suitably in the lower part of the housing. In the housing, at its rear end, is a trough, $n$, by which the grain, if after once passing the grain through the thrasher it needs further cleaning, is passed thereinto, and from there it is conducted into a tube, L, with its end elevated and emptying into the feed-hopper, and provided with an endless elevating-belt with a tightening and loosening screw, $o$, acting upon said belt. In the same end of the housing is a shaft, L′, with a series of beaters, $o'$ $o'$, to further beat or treat the grain to a beating action, and therefore more certainly eliminate the grain.

Having thus fully described our invention, we claim and desire to secure by Letters Patent—

The combination of the slotted rack-frame and the toothed beams C″, operating through the slots of said frame, said frame and beams being connected to rocking shafts arranged to give them opposite oscillations to toss and carry rearward the straw, substantially as set forth.

In testimony that we claim the foregoing as our own we have hereto affixed our signatures in presence of two witnesses.

MICHAEL SULLIVAN.
HANS CHRISTOFFORSON.

Witnesses:
MICHAEL McCARTHEY, Jr.,
PEMBROKE RUTHVEN PROCTOR.